US007097899B2

(12) United States Patent
Daems et al.

(10) Patent No.: US 7,097,899 B2
(45) **Date of Patent: *Aug. 29, 2006**

(54) CARRIER OF INFORMATION BEARING A WATERMARK

(75) Inventors: Eddie Daems, Herentals (BE); Luc Leenders, Herentals (BE)

(73) Assignee: Agfa-Gevaert, Mortsel (BE)

( * ) Notice: Subject to any disclaimer, the term of this patent is extended or adjusted under 35 U.S.C. 154(b) by 331 days.

This patent is subject to a terminal disclaimer.

(21) Appl. No.: 10/659,622

(22) Filed: Sep. 10, 2003

(65) Prior Publication Data

US 2004/0053017 A1 Mar. 18, 2004

Related U.S. Application Data

(60) Provisional application No. 60/412,829, filed on Sep. 23, 2002.

(30) Foreign Application Priority Data

Sep. 13, 2002 (EP) .................................. 02102358

(51) Int. Cl.
*B32B 3/00* (2006.01)
*B32B 5/16* (2006.01)
*B32B 7/14* (2006.01)

(52) U.S. Cl. ................... 428/204; 428/212; 428/32.18; 428/32.37

(58) Field of Classification Search ................ 428/204, 428/212, 32.18, 32.37
See application file for complete search history.

(56) References Cited

U.S. PATENT DOCUMENTS

| | | | | |
|---|---|---|---|---|
| 3,414,998 A | | 12/1968 | Berger | 40/2.2 |
| 4,520,063 A | | 5/1985 | Simon et al. | 428/195 |
| 5,275,870 A | * | 1/1994 | Halope et al. | 428/199 |
| 6,171,734 B1 | * | 1/2001 | Warner et al. | 430/10 |
| 6,210,777 B1 | * | 4/2001 | Vermeulen et al. | 428/195.1 |

FOREIGN PATENT DOCUMENTS

| | | |
|---|---|---|
| CA | 0858056 | 8/1998 |
| DE | 3920378 | 1/1991 |
| DE | 10021896 | 11/2001 |

OTHER PUBLICATIONS

European Search Report, EP02102358, Feb. 28, 2003, E. Greiner.

* cited by examiner

*Primary Examiner*—B. Shewareged
(74) *Attorney, Agent, or Firm*—Joseph T. Guy; Nexsen Pruet, LLC

(57) ABSTRACT

An information carrier comprising a support and a receiving layer is disclosed, together with the method of preparation. The information carrier further comprises (optionally personalized) information applied, preferably by ink jet printing, on the receiver layer, and a new type of watermark, obtained by applying pattern-wise a curable varnish and curing it, and by curing an overall applied curable lacquer. One of the varnish and the lacquer have the ability upon penetration into the receiving layer of changing its transparency, thus creating a transparent watermark on an opaque background, or creating a opaque watermark on an transparent background. The finished information carrier is preferably cut in a set of multiple identification (ID) cards.

56 Claims, No Drawings

CARRIER OF INFORMATION BEARING A WATERMARK

CROSS-REFERENCE TO RELATED PATENT APPLICATIONS

This application claims the benefit of U.S. Provisional Application No. 60/412,829 filed Sep. 23, 2002, which is incorporated by reference. In addition, this application claims the benefit of European Application No. 02102358.5 filed Sep. 13, 2002, which is also incorporated by reference.

FIELD OF THE INVENTION

The present invention relates to a method for the preparation of an improved carrier of information, and to ID cards cut from it.

BACKGROUND OF THE INVENTION

In recent years, with the progress of information-oriented society several types of identification (ID card) cards have come into use. For instance, cards involved in the electronic transfer of money include bank cards, pay cards, credit cards and shopping cards. Different types of security cards authorize access to the bearer of the card to particular areas such as a company (employee ID card), the military, a public service, the safe department of a bank, etc. For long time national states have issued identity cards to establish the national identity of their civilians. Still other types of identification cards include social security cards, membership cards of clubs and societies, and driver's licence cards. Such ID cards usually contain information referring both to the authority issuing the card on the one hand and to the owner of the card. The first type of information may be general information such as a name and/or logo of the issuing authority, or security marks, such as a watermark and security print, e.g a repeating monochrome pattern or a gradually changing colour pattern which are difficult to counterfeit. The second type includes e.g. the unique card number, personal data such as a birth day, a photo of the owner, and a signature. The card can further contain hidden information and therefore contain a magnetic strip or an electronic chip ("smart cards").

A large set of ID cards are usually prepared on a large carrier of information such as a web or sheet by a step and repeat process, after which the information carrier is cut into multiple items with the appropriate dimensions each representing a personal ID card. Smart cards and ID cards have now the standardized dimensions of 85.6 mm×54.0 mm×0.76 mm.

Normally, the card is protected by a plastic sheet material such as by lamination of the card to a plastic sheet or, as it is usually the case by lamination between two plastic sheets.

In view of their widespread uses, especially in commercial transactions, such as cashing checks, credit purchases, etc., it is important that the person relying on the ID card to identify the bearer have maximum assurance that the ID card has not been altered and/or that the ID card is not a counterfeit. A great deal of ingenuity has been employed to provide this desired degree of assurance. For example, specialized adhesive systems and lamination techniques have been developed to prevent or discourage alteration of ID cards. These systems and techniques are designed to achieve a high degree of bonding efficiency between a surface of the card and any plastic sheet material bonded to it. Certain adhesive systems, for example, can provide what is known in the art as a "security seal". A "security seal" is best explained by describing what happens if an attempt is made to pull a plastic sheet material from the surface of a card bonded to the plastic. If a "security seal" exists, all or at least portions of the adhered surface will be removed from the card together with the plastic sheet material. Accordingly, a "security seal" is normally established between the information-bearing surface of the card or document and the plastic. Under such circumstances, removal of the plastic should also remove substantial portions of the information-bearing surface of the card to render the card unusable for alteration purposes. Adhesives or adhesive systems which can provide "security seals" are described in e.g. U.S. Pat. Nos. 3,582,439, 3,614,839 and 4,115,618. According to U.S. Pat. No. 4,322,461 a security seal can be provided by applying heat-sealable polymers so as to obtain a sealed envelop-type pouch.

Furthermore, the art's response to the counterfeiting problem has involved the integration of "verification features" with ID cards to evidence their authenticity. The best known of these "verification features" involve signatures such as the signature of the person authorized to issue the ID card or the signature of the bearer. Other "verification features" have involved the use of watermarks, fluorescent materials, validation patterns or markings and polarizing stripes among others. These "verification features" are integrated into ID cards in various ways and they may be "visible" or "invisible" in the finished card. If "invisible", they can be detected by viewing the feature under conditions which render it visible. Details relating to the use of "verification features" in ID cards can be found, for example: U.S. Pat. Nos. 2,984,030; 3,279,826; 3,332,775; 3,414,998; 3,675,948; 3,827,726 and 3,961,956.

The present invention extends the teaching on verification marks, and particularly on watermarks.

OBJECTS OF THE INVENTION

It is an object of the present invention to provide an improved type of information carrier, which can be easily manufactured, has an uncomplicated layer structure, and can be cut in a set of multiple ID cards.

It is a further object of the present invention to provide a method for the fabrication of an improved type of information carrier which can be easily manufactured, has an uncomplicated layer structure, and can be cut in a set of multiple ID cards.

It is also an object of the present invention that the information carrier thus obtained and the ID cards, which are optionally cut from it bear a new type of watermark.

It is still another object of the present invention that the ID cards, which can be cut from the information carrier are tamper proof.

SUMMARY OF THE INVENTION

It has been surprisingly found that upon penetration by a varnish or lacquer a previously opaque porous receiving layer comprising a pigment and a binder can be rendered substantially transparent i.e. that the resulting layer comprising at least three components is substantially transparent, despite the fact that a layer containing at least two of the three components is opaque. Furthermore, it has been found that a substantially transparent porous receiving layer comprising a pigment and a binder can be rendered opaque upon penetration by a varnish or lacquer despite the fact that a layer containing at least two of the components is transparent. These effects form the basis of the realization of watermarks in the information carriers of the present invention.

Objects of the present invention are realized by an information carrier comprising: a rigid sheet or web support; an opaque porous receiving layer capable of being rendered substantially transparent by penetration by a lacquer, said receiving layer containing a pigment and a binder; an image provided onto and/or in said receiving layer; a cured pattern of a varnish provided onto said receiving layer provided with said image or onto and/or in said receiving layer provided with said image if said varnish is incapable of rendering said receiving layer transparent; and a cured layer of said lacquer provided on said receiving layer provided with said image and said cured pattern of said varnish, said lacquer having rendered said parts of said receiving layer in contact therewith substantially transparent, wherein said cured pattern of said varnish forms an opaque watermark.

Objects of the present invention are also realized by an information carrier comprising: a rigid sheet or web support; an opaque porous receiving layer capable of being rendered substantially transparent by penetration by a varnish, said receiving layer containing a pigment and a binder; an image provided onto and/or in said receiving layer; a cured pattern of said varnish provided in said receiving layer provided with said image; and a cured layer of a lacquer provided onto said receiving layer provided with said image and said cured pattern of said varnish, or onto and/or in said receiving layer provided with said image and said cured pattern of said varnish if said lacquer is incapable of rendering said receiving layer transparent, said varnish having rendered said parts of said receiving layer in contact therewith substantially transparent, wherein said cured pattern of said lacquer forms a substantially transparent watermark.

Objects of the present invention are also realized by an information carrier comprising: a rigid sheet or web support; a transparent porous receiving layer capable of being rendered substantially opaque by penetration by a lacquer, said receiving layer containing a pigment and a binder; an image provided onto and/or in said receiving layer; a cured pattern of a varnish provided onto said receiving layer provided with said image, or onto and/or in said receiving layer provided with said image if said varnish is incapable of rendering said receiving layer opaque; and a cured layer of said lacquer provided on said receiving layer provided with said image and said cured pattern of said varnish, said lacquer having rendered said parts of said receiving layer in contact therewith substantially opaque, wherein said cured pattern of said varnish forms a transparent watermark.

Objects of the present invention are also realized by an information carrier comprising: a rigid sheet or web support; a transparent porous receiving layer capable of being rendered substantially opaque by penetration by a varnish, said receiving layer containing a pigment and a binder; an image provided onto and/or in said receiving layer; a cured pattern of said varnish provided in said receiving layer provided with said image; and a cured layer of a lacquer provided onto said receiving layer provided with said image and said cured pattern of said varnish, or onto and/or in said receiving layer provided with said image and said cured pattern of said varnish if said lacquer is incapable of rendering said receiving layer opaque, said varnish having rendered said parts of said receiving layer in contact therewith substantially opaque, wherein said cured pattern of said lacquer forms a substantially opaque watermark.

Objects of the present invention are also realized by a method for producing a carrier of information, said method comprising the following steps, in order, (1) providing a two-layer assemblage comprising (i) a rigid sheet or web support optionally preprinted with security print, and (ii) a porous opaque receiving layer comprising a pigment and a binder, (2) printing digitally stored information on said porous receiving layer, (3) applying on top of said layer in a predetermined pattern a curable varnish, by means of printing, spraying or jetting, (4) curing said applied varnish, whereby the parts of the receiving layer under said predetermined pattern remain non-transparent, (5) overall covering the thus obtained assemblage by coating, printing, spraying or jetting, with a curable lacquer whereby said lacquer penetrates all areas of the receiving layer not covered by the pattern of the varnish and renders them substantially transparent, and whereby the non-transparent pattern obtained by application of the varnish forms an opaque watermark, (6) subjecting the thus obtained assemblage to a second curing step.

Objects of the present invention are also realized by a method for producing a carrier of information, said method comprising the following steps, in order, (1') providing a two-layer assemblage comprising (i) a rigid sheet or web support optionally preprinted with security print, and (ii) a porous opaque receiving layer comprising a pigment and a binder, (2') printing digitally stored information on said porous receiving layer, (3') applying on top of said receiving layer in a predetermined pattern a curable varnish by means of printing, spraying or jetting, whereby said varnish penetrates said receiving layer, thereby creating a transparent pattern, (4') after penetration, subjecting the thus obtained assemblage to a curing step, (5') overall covering the thus obtained assemblage by coating, printing, spraying or jetting, with a curable lacquer, (6') subjecting the thus obtained assemblage to a second curing step, whereby the pattern penetrated by the varnish remains transparent and forms a substantially transparent watermark, and the other parts of the image carrier remain opaque.

Objects of the present invention are also realized by a method for producing a carrier of information, said method comprising the following steps, in order, (I) providing a two-layer assemblage comprising (i) a rigid sheet or web support optionally preprinted with security print, and (ii) a porous transparent receiving layer comprising a pigment and a binder, (II) printing digitally stored information on said porous receiving layer, (III) applying on top of said receiving layer in a predetermined pattern a curable varnish, by means of printing, spraying or jetting, (IV) curing said applied varnish, whereby the parts of the receiving layer under said predetermined pattern remain transparent, (V) overall covering the thus obtained assemblage by coating, printing, spraying or jetting, with a curable lacquer whereby said lacquer penetrates all areas of the receiving layer not covered by the pattern of the varnish and renders them substantially opaque, and whereby the transparent pattern obtained by application of the varnish forms a transparent watermark, (6) subjecting the thus obtained assemblage to a second curing step.

Objects of the present invention are also realized by a method for producing a carrier of information, said method comprising the following steps, in order, (I') providing a two-layer assemblage comprising (i) a rigid sheet or web support optionally preprinted with security print, and (ii) a porous transparent receiving layer comprising a pigment and a binder, (II') printing digitally stored information on said porous receiving layer, (III') applying on top of said receiving layer in a predetermined pattern a curable varnish by means of printing, spraying or jetting, whereby said varnish penetrates the receiving layer, thereby creating a substantially opaque pattern, (IV') after penetration, subjecting the thus obtained assemblage to a curing step, (V') overall covering the thus obtained assemblage by coating, printing, spraying or jetting, with a curable lacquer, (VI') subjecting the thus obtained assemblage to a second curing step, whereby the pattern penetrated by the varnish remains opaque and forms an opaque watermark, and the other parts of the image carrier remain transparent.

Further advantages and embodiments of the present invention will become apparent from the following description.

DETAILED DESCRIPTION OF THE INVENTION

Definitions

In disclosing the present invention the terms "opaque" or "non-transparent" layer refers to a layer where less than 10% of the incident visible light is allowed to pass through the layer. In a "substantially transparent" layer at least 50% of the incident visible light, preferably more than 65% and particularly preferably more than 75%, passes through the layer.

We define the refractive index as a specific number, being the average of the range for possible refractive indices (e.g. 1.51 for polyvinylalcohol with a refractive index range of 1.49 to 1.53) if a range of refractive indices is present for the particular material.

In disclosing the present invention the terms "on", "onto" and "in" have very precise meanings with respect to a layer: "on" means that penetration of the layer may or may not occur, "onto" means at least 90% on the top of i.e. there is no substantial penetration into the layer, and "in" means that penetration into the respective layer or layers occurs. With printing digitally stored information "on" a porous receiving layer, we understand that an image is provided "onto and/or in" said receiving layer. In the case of ink jet printing, if the ink remains on top of the receiving layer, the image is provided "onto" said receiving layer. If the ink penetrates into said porous receiving layer, it is "in" the layer. The same terminology is used for the varnish and the lacquer. For example, "before substantial penetration of the varnish in the receiving layer", means that ≦10% of the varnish is located "in" the receiving layer.

The curable varnish and lacquer compositions used in the present invention may have similar compositions. To avoid confusion, the term "varnish" has therefore been used to designate the curable composition, which is applied patternwise in the present invention, and the term "lacquer" has been used to designate the composition, which is applied overall. The lacquer may not necessarily contain a cellulose derivative.

The term watermark as used in disclosing the present invention means a localized modification of the structure and opacity of a layer so that a pattern or design can be seen when the information carrier is held to the light.

The term security print as used in disclosing the present invention means a concretely recognizable design, or an abstract periodically-repeating monochrome or multichrome pattern, or a gradually changing colour pattern, which gradually changes in hue and/or density of the colours, and is in this way difficult to counterfeit. The security print may further contain, for example, a logo, name or abbreviation of the issuing authority of the information carrier.

Information Carrier

In a preferred embodiment the digitally stored information is printed onto said porous receiving layer by means of ink jet printing.

In a further preferred embodiment the application of the printed information and of the cured watermark is repeated multiple times according to a fixed pattern over the area of the information carrier, and finally the finished assemblage is cut into a set of multiple identification (ID) cards.

We will describe now in more detail the particular layer arrangement and the ingredients of the information carrier in accordance with the present invention.

Sheet or Web Support

The support for use in the present invention can be transparent, translucent or opaque, and can be chosen from paper type and polymeric type supports well-known from photographic technology. Paper types include plain paper, cast coated paper, polyethylene coated paper and polypropylene coated paper. Polymeric supports include cellulose acetate propionate or cellulose acetate butyrate, polyesters such as polyethylene terephthalate and polyethylene naphthalate, polyamides, polycarbonates, polyimides, polyolefins, poly(vinylacetals), polyethers and polysulfonamides. Other examples of useful high-quality polymeric supports for the present invention include opaque white polyesters and extrusion blends of polyethylene terephthalate and polypropylene. Polyester film supports and especially polyethylene terephthalate are preferred because of their excellent properties of dimensional stability. When such a polyester is used as the support material, a subbing layer may be employed to improve the bonding of the receiving layer to the support. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers. In a most preferred embodiment of the present invention the support is colored or whitened polyvinyl chloride or polyethylene terephthalate.

Receiving Layer

Essential to the present invention is that the receiving layer is porous and contains a binder and a pigment.

The binder can be chosen from a list of compounds well-known in the art including hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; polyethylene oxide; polyurethane; melamine resins; gelatin; carrageenan; dextran; gum arabic; casein; pectin; albumin; starch; collagen derivatives; collodion and agar-agar.

A preferred binder for the practice of the present invention is a polyvinylalcohol (PVA), a vinylalcohol copolymer or modified polyvinyl alcohol. Most preferably, the polyvinyl alcohol is a silanol modified polyvinyl alcohol. Most useful commercially available silanol modified polyvinyl alcohols can be found in the POVAL R polymer series, trade name of Kuraray Co., Japan. This R polymer series includes the grades R-1130, R-2105, R-2130, R-3109, which differ mainly in the viscosity of their respective aqueous solutions. The silanol groups are reactive to inorganic substances such as silica or alumina. R-polymers can be easily crosslinked by changing the pH of their aqueous solutions or by mixing with organic substances and can form water resistant films.

The pigment may be chosen from the inorganic pigments well-known in the art such as silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, boehmite (alumina hydrate), zirconium oxide or mixed oxides. In a preferred embodiment the main pigment is chosen from silica, aluminosilicate, alumina, calcium carbonate, alumina hydrate, and aluminum trihydroxide.

The use of aluminum oxide (alumina) in receiving layers is disclosed in several patents, e.g. in U.S. Pat. Nos. 5,041,328, 5,182,175, 5,266,383, EP 218956, EP 835762 and EP 972650.

Commercially available types of aluminum oxide (alumina) include $\alpha$-$Al_2O_3$ types, such as NORTON E700, available from Saint-Gobain Ceramics & Plastics, Inc, $\gamma$-$Al_2O_3$ types, such as ALUMINUM OXID C from Degussa, Other Aluminum oxide grades, such as BAIKALOX CR15 and CR30 from Baikowski Chemie; DURALOX grades and MEDIALOX grades from Baikowski Chemie, BAIKALOX CR80, CR140, CR125, B105CR from Baikowski Chemie; CAB-O-SPERSE PG003 tradeamrk from Cabot, CATALOX GRADES and CATAPAL GRADES from Sasol, such as PLURALOX HP14/150; colloidal $Al_2O_3$ types, such as ALUMINASOL 100; ALUMINASOL 200, ALUMINASOL 220, ALUMINASOL 300, and ALUMINASOL 520 trademarks from Nissan Chemical Industries or NALCO 8676 trademark from ONDEO Nalco.

A useful type of alumina hydrate is $\gamma$-AlO(OH), also called boehmite, such as, in powder form, DISPERAL, DISPERAL HP14 and DISPERAL 40 from Sasol, MARTOXIN VPP2000-2 and GL-3 from Martinswerk GmbH.; Liguid boehmite alumina systems, e.g. DISPAL 23N4-20, DISPAL 14N-25, DISPERAL AL25 from Sasol. Patents on alumina hydrate include EP 500021, EP 634286, U.S. Pat. No. 5,624,428, EP 742108, U.S. Pat. No. 6,238,047, EP 622244, EP 810101, etc.

Useful aluminum trihydroxides include Bayerite, or $\alpha$-Al$(OH)_3$, such as PLURAL BT, available from Sasol, and Gibbsite, or $\gamma$-Al$(OH)_3$, such as MARTINAL grades from Martinswerk GmbH, MARTIFIN grades, such as MARTIFIN OL104, MARTIFIN OL 107 and MARTIFIN OL111 from Martinswerk GmbH , MICRAL grades, such as MICRAL 1440, MICRAL 1500; MICRAL 632; MICRAL 855; MICRAL 916; MICRAL 932; MICRAL 932CM; MICRAL 9400 from JM Huber company; HIGILITE grades, e.g. HIGILITE H42 or HIGILITE H43M from Showa Denka K. K., HYDRAL GRADES such as HYDRAL COAT 2, HYDRAL COAT 5 and HYDRAL COAT 7, HYDRAL 710 and HYDRAL PGA, from Alcoa Industrial Chemicals.

A useful type of zirconium oxide is NALCO OOSS008 trademark of ONDEO Nalco, acetate stabilized ZrO2, ZR20/20, ZR50/20, ZR100/20 and ZRYS4 trademarks from Nyacol Nano Technologies. Useful mixed oxides are SIRAL grades from Sasol, colloidal metaloxides from Nalco such as Nalco 1056, Nalco TX10496, Nalco TX11678.

Silica as pigment in receiving elements is disclosed in numerous old and recent patents, e.g. U.S. Pat. Nos. 4,892,591, 4,902,568, EP 373573, EP 423829, EP 487350, EP 493100, EP 514633, etc. Different types of silica may be used, such as crystalline silica, amorphous silica, precipitated silica, gel silica, fumed silica, spherical and non-spherical silica, calcium carbonate compounded silica such as disclosed in U.S. Pat. No. 5,281,467, and silica with internal porosity such as disclosed in WO 00/02734.

The use of calcium carbonate in receiving layers is described in e.g. DE 2925769 and U.S. Pat. No. 5,185,213. The use of alumino-silicate is disclosed in e.g. DE 2925769.

Mixtures of different pigments may be used.

In an alternative embodiment the main pigment can be chosen from organic particles such as polystyrene, polymethyl methacrylate, silicones, melamine-formaldehyde condensation polymers, urea-formaldehyde condensation polymers, polyesters and polyamides. Mixtures of inorganic and organic pigments can be used. However, most preferably the pigment is an inorganic pigment.

The pigment must be present in a sufficient coverage in order to render the receiving layer sufficiently opaque and porous. The lower limit of the ratio by weight of the binder to the total pigment in the receiving layer is preferably about 1:50, most preferably 1:20, while the upper limit thereof is about 2:1, most preferably 1:1. If the amount of the pigment exceeds the upper limit, the strength of the receiving layer itself is lowered, and the resulting image hence tends to deteriorate in rub-off resistance and the like. On the other hand, if the binder to pigment ratio is too great, the ink-absorbing capacity of the resulting receiving layer is reduced, and so the image formed may possibly be deteriorated.

Further, preferably, the refraction indices of the pigment on the one hand, and of the UV-curable composition, which penetrates the opaque porus receiving layer (see description lateron) on the other hand should match each other as closely as possible. The closer the match of the refraction indices the better the transparency which will be obtained after impregnation of the receiver layer with the photopolymerizable composition.

Inorganic pigments with a refractive index in the range from 1.45 to 1.55 are preferred. The most preferred pigment is a silica type, more particularly an amorphous silica having a average particle size ranging from 1 μm to 15 μm, most preferably from 2 to 10 μm. A most useful commercial compound is the amorphous precipitated silica type SIPERNAT 570, trade name from Degussa Co. It is preferably present in the receiving layer in an amount ranging from 5 $g/m^2$ to 30 $g/m^2$. It has following properties specific surface area ($N_2$ absorption): 750 $m^2/g$ mean particle size (Multisizer, 100 μm capillarity): 6.7 μm DBP adsorption: 175–320 g/100 g refractive index: 1.45 to 1.47.

Since the refractive index of a typical UV-curable lacquer composition is about 1.47 to 1.49 it is clear that there is good match with the refractive index of this particular silica type, and good transparency will be obtained, but may not be obtained if another component is present.

Other usable precipitated silica types include SIPERNAT 310, 350 and 500, AEROSIL grades (trade mark of Degussa-Hüls AG), and SYLOID types (trade mark from Grace Co.).

A receiving layer containing a porous alumina pigment such as MARTINOX GL-1 does not become substantially transparent on impregnation with the typical UV-curable compositions with a refractive index of 1.47 to 1.49 because its refractive index is 1.6. However, UV-curable compositions with higher refractive indexes are possible e.g. including N-vinyl carbazole as comonomer. Moreover a layer with this pigment exhibits a strong improvement in adhesion between support and ink jet receiving layer upon impregnation with a UV-curable composition.

The binder also may have an effect on the opacity of the receiving layer. Where the ratio by weight of the binder to the total pigment in the receiving layer approaches the above described upper limit of 2:1, a binder will render the receiving layer more transparent, on the condition that there is a good match of the refractive index of the binder with the refractive index of the pigment. On the other hand, a combination of the above-mentioned silica pigment SIPERNAT 570 with polyvinylalcohol (refractive index 1.49 to 1.53) produces an opaque layer, since there is a poor match between the refraction indices. It was surprising to find that a receiving layer, containing this silica pigment SIPERNAT 570 and a polyvinylalcohol could be rendered transparent by a lacquer, even at a ratio by weight of the binder to the total pigment in the receiving layer of 0.14.

In order to define "boundaries" for a good match between refractive indices, in the case of a range of refractive indices is being present for a particular material we define the refractive index as a specific number, being the average of the range for possible refractive indices (e.g. 1.46 for SIPERNAT 570, 1.51 for polyvinylalcohol and 1.48 for the typical UV-curable lacquer mentioned earlier with a refractive index range of 1.47 to 1.49). The difference in refractive index of SIPERNAT 570 and polyvinylalcohol is 0.05, while the difference in refractive index of SIPERNAT 570 and the typical UV-curable lacquer is only 0.02. Therefor, an opaque receiving layer containing a pigment and a binder can be rendered substantially transparant by a lacquer if the difference in refractive index of the pigment and the lacquer is no more than 0.04, and more preferably no more than 0.02. However, account should be taken of the fact that the binder may also have an effect on the opacity of the receiving layer. This results in the following possible situations:

- an opaque receiving layer of an information carrier can be rendered transparent by a lacquer if the refractive index of the pigment and the refractive index of the lacquer in the receiving layer differ by no more than 0.04 and if the refractive index of the binder and the refractive index of the lacquer differ by no more than 0.04 when the ratio by weight of the binder to total pigment becomes larger than 0.14.
- an opaque receiving layer of an information carrier remains opaque if the refractive index of the pigment and the refractive index of the lacquer in the receiving layer differ by more than 0.04.
- a transparent receiving layer of an information carrier, i.e. in which the refractive index of the binder and the refractive index of the pigment differ by no more than 0.04, can be rendered opaque by a lacquer if the refractive index of the pigment in the receiving layer and the refractive index of the lacquer penetrating in the receiving layer differ by more than 0.04.
- a transparent receiving layer of an information carrier, i.e. in which the refractive index of the binder and the refractive index of the pigment differ by no more than 0.04, can remain transparent by a lacquer if the refractive index of the pigment in the receiving layer and the refractive index of the lacquer penetrating in the receiving layer differ by no more than 0.04.

Apart from the essential ingredients described above a cationic substance acting as mordant may be present in the receiving layer. Such substances increase the capacity of the layer for fixing and holding the dye of the ink droplets. A particularly suited compound is a poly(diallyldimethylammonium chloride) or, in short, a poly(DADMAC). These compounds are commercially available from several companies, e.g. Aldrich, Nalco, CIBA, Nitto Boseki Co., Clariant, BASF and EKA Chemicals.

Other useful cationic compounds include DADMAC copolymers such as copolymers with acrylamide, e.g NALCO 1470 trade mark of ONDEO Nalco or PAS-J-81, trademark of Nitto Boseki Co., such as copolymers of DADMAC with acrylates, such as Nalco 8190, trademark of ONDEO Nalco; copolymers of DADMAC with $SO_2$, such as PAS-A-1 or PAS-92, trademarks of Nitto Boseki Co., copolymer of DADMAC with maleic acid, e.g. PAS-410, trademark of Nitto Boseki Co., copolymer of DADMAC with diallyl(3-chloro-2-hydroxypropyl)amine hydrochloride, eg. PAS-880, trademark of Nitto Boseki Co., dimethylamineepichlorohydrine copolymers, e.g. Nalco 7135, trademark of ONDEO Nalco or POLYFIX 700, trade name of Showa High Polymer Co.; other POLYFIX grades which could be used are POLYFIX 601, POLYFIX 301, POLYFIX 301A, POLYFIX 250WS, and POLYFIX 3000; NEOFIX E-117, trade name of Nicca Chemical Co., a polyoxyalkylene polyamine dicyanodiamine, and REDIFLOC 4150, trade name of EKA Chemicals, a polyamine; MADAME (methacrylatedimethylaminoethyl=dimethylaminoethyl methacrylate) or MADQUAT (methacryloxyethyltrimethylammonium chloride) modified polymers, e.g. ROHAGIT KL280, ROHAGIT 210, ROHAGIT SL144, PLEX 4739L, PLEX 3073 from Röhm, DIAFLOC KP155 and other DIAFLOC products from Diafloc Co., and BMB 1305 and other BMB products from EKA chemicals; cationic epichlorohydrin adducts such as POLYCUP 171 and POLYCUP 172, trade names from Hercules Co.; from Cytec industries: CYPRO products, e.g. CYPRO 514/515/516, SUPERFLOC 507/521/567; cationic acrylic polymers, such as ALCOSTAT 567, trademark of CIBA, cationic cellulose derivatives such as CELQUAT L-200, H-100, SC-240C, SC230M, trade names of Starch & Chemical Co., and QUATRISOFT LM200, UCARE polymers JR125, JR400, LR400, JR30M, LR30M and UCARE polymer LK; fixing agents from Chukyo Europe: PALSET JK-512, PALSET JK512L, PALSET JK-182, PALSET JK-220, WSC-173, WSC-173L, PALSET JK-320, PALSET JK-320L and PALSET JK-350; polyethyleneimine and copolymers, e.g. LUPASOL, trade name of BASF AG; triethanolamine-titaniumchelate, e.g. TYZOR, trade name of Du Pont Co.; copolymers of vinylpyrrolidone such as VIVIPRINT 111, trade name of ISP, a methacrylamido propyl dimethylamine copolymer; with dimethylaminoethylmethacrylate such as COPOLYMER 845 and COPOLYMER 937, trade names of ISP; with vinylimidazole, e.g. LUVIQUAT CARE, LUVITEC 73W, LUVITEC VPI55 K18P, LUVITEC VP155 K72W, LUVIQUAT FC905, LUVIQUAT FC550, LUVIQUAT HM522, and SOKALAN HP56, all trade names of BASF AG; polyamidoamines, e.g. RETAMINOL and NADAVIN, trade marks of Bayer AG; phosphonium compounds such as disclosed in EP 609930 and other cationic polymers such as NEOFIX RD-5, trademark of Nicca Chemical Co.

The receiving layer may further contain well-known conventional ingrediënts, such as surfactants serving as coating aids, hardening agents, plasticizers, whitening agents and matting agents. Surfactants may be any of the cationic, anionic, amphoteric, and non-ionic ones as described in JP-A 62-280068 (1987). Examples of the surfactants are N-alkylamino acid salts, alkylether carboxylic acid salts, acylated peptides, alkylsulfonic acid salts, alkylbenzene and alkylnaphthalene sulfonic acid salts, sulfosuccinic acid salts, α-olefin sulfonic acid salts, N-acylsulfonic acid salts, sulfonated oils, alkylsulfonic acid salts, alkylether sulfonic acid salts, alkylallylethersulfonic acid salts, alkylamidesulfonic acid salts, alkylphosphoric acid salts, alkyletherphosphoric acid salts, alkylallyletherphosphoric acid salts, alkyl and alkylallylpolyoxyethylene ethers, alkylallylformaldehyde condensed acid salts, alkylallylethersulfonic acid salts, alkylamidesulfonic acid salts, alkylphosphoric acid salts, alkyletherphosphoric acid salts, alkylallyletherphosphoric acid salts, alkyl and alkylallylpolyoxyethylene ethers, alkylallylformaldehyde condensed polyoxyethylene ethers, blocked polymers having polyoxypropylene, polyoxyethylene polyoxypropylalkylethers, polyoxyethyleneether of glycolesters, polyoxyethyleneether of sorbitanesters, polyoxyethyleneether of sorbitolesters, polyethyleneglycol aliphatic acid esters, glycerol esters, sorbitane esters, propyleneglycol esters, sugaresters, fluoro $C_2$–$C_{10}$ alkylcarboxylic acids, disodium N-perfluorooctanesulfonyl glutamate, sodium 3-(fluoro-$C_6$–$C_{11}$-alkyloxy)-1-$C_3$–$C_4$ alkyl sulfonates, sodium 3-(ω-fluoro-$C_6$–$C_8$-alkanoyl-N-ethylamino)-1-propane sulfonates, N-[3-(perfluorooctanesulfonamide)-propyl]-N,N-dimethyl-Ncarboxymethylene ammonium betaine, fluoro-$C_{11}$–$C_{20}$ alkylcarboxylic acids, perfluoro-$C_7$–$C_{13}$-alkyl-carboxylic acids, perfluorooctane sulfonic acid diethanolamide, Li, K and Na perfluoro-$C_4$–$C_{12}$-alkyl sulfonates, N-propyl-N-(2-hydroxyethyl)perfluorooctane sulfonamide, perfluoro-$C_6$–$C_{10}$-alkylsulfonamide-propyl-sulfonyl-glycinates, bis-(N-perfluorooctylsulfonyl-N-ethanolaminoethyl) phosphonate, mono-perfluoro $C_6$–$C_{16}$ alkyl-ethyl phosphonates, and perfluoroalkylbetaine.

Useful cationic surfactants include N-alkyl dimethyl ammonium chloride, palmityl trimethyl ammonium chloride, dodecyldimethylamine, tetradecyldimethylamine, ethoxylated alkyl guanidine-amine complex, oleamine hydroxypropyl bistrimonium chloride, oleyl imidazoline, stearyl imidazoline, cocamine acetate, palmitamine, dihydroxyethylcocamine, cocotrimonium chloride, alkyl polyglycolether ammonium sulphate, ethoxylated oleamine, lauryl pyridinium chloride, N-oleyl-1,3-diaminopropane, stearamidopropyl dimethylamine lactate, coconut fatty amide, oleyl hydroxyethyl imidazoline, isostearyl ethylimidonium ethosulphate, lauramidopropyl PEG-dimonium-chloride phosphate, palmityl trimethylammonium chloride, and cetyltrimethylammonium bromide.

Especially useful are the fluorocarbon surfactants as described in e.g. U.S. Pat. No. 4,781,985, having a structure of: $F(CF_2)_{4-9}CH_2CH_2SCH_2CH_2N^+R_3X^-$ wherein R is a hydrogen or an alkyl group; and in U.S. Pat. No. 5,084,340, having a structure of: $CF_3(CF_2)_mCH_2CH_2O(CH_2CH_2O)_nR$ wherein m=2 to 10; n=1 to 18; R is hydrogen or an alkyl group of 1 to 10 carbon atoms. These surfactants are commercially available from DuPont and 3M. The concentration of the surfactant component in the receiving layer is typically in the range of 0.1 to 2%, preferably in the range of 0.4 to 1.5% and is most preferably 0.75% by weight based on the total dry weight of the layer.

The receiving layer may be crosslinked to provide such desired features as waterfastness and non-blocking characteristics. The crosslinking is also useful in providing abrasion resistance and resistance to the formation of fingerprints on the element as a result of handling. There are a vast number of known crosslinking agents—also known as hardening agents—that will function to crosslink film forming binders. Hardening agents can be used individually or in combination and in free or in blocked form. A great many hardeners, useful for the present invention, are known, including formaldehyde and free dialdehydes, such as succinaldehyde and glutaraldehyde, blocked dialdehydes, active esters, sulfonate esters, active halogen compounds, isocyanate or blocked isocyanates, polyfunctional isocyanates, melamine derivatives, s-triazines and diazines, epoxides, active olefins having two or more active bonds, carbodiimides, zirconium complexes, e.g. BACOTE 20, ZIRMEL 1000 or zirconium acetate, trademarks of MEL Chemicals, titanium complexes, is such as TYZOR grades from DuPont, isoxazolium salts subsituted in the 3-position, esters of 2-alkoxy-N-carboxy-dihydroquinoline, N-carbamoylpyridinium salts, hardeners of mixed function, such as halogen-substituted aldehyde acids (e.g. mucochloric and mucobromic acids), onium substituted acroleins and vinyl sulfones and polymeric hardeners, such as dialdehyde starches and copoly(acroleinmethacrylic acid), and oxazoline functional polymers, e.g. EPOCROS WS-500, and EPOCROS K-1000 series, and maleic anhydride copolymers, e.g. GANTREZ AN119.

The receiving layers and the optional supplementary layers of the present invention may also comprise a plasticizer such as ethylene glycol, diethylene glycol, propylene glycol, polyethylene glycol, glycerol monomethylether, glycerol monochlorohydrin, ethylene carbonate, propylene carbonate, tetrachlorophthalic anhydride, tetrabromophthalicanhydride, urea phosphate, triphenylphosphate, glycerolmonostearate, propylene glycol monostearate, tetramethylene sulfone, n-methyl-2-pyrrolidone, n-vinyl-2-pyrrolidone.

The receiving layers and optional extra layers of the present invention may also comprise ingredients to improve the lightfastness of the printed image, such as antioxidants, UV-absorbers, peroxide scavengers, singlet oxygen quenchers such as hindered amine light stabilizers, (HALS compounds) etc. Stilbene compounds are a preferred type of UV-absorber.

Curable Varnish and Lacquer Compositions

The curable varnish and lacquer compositions used in the information carriers, according to the present invention, may have similar compositions. However, to avoid confusion, we have somewhat arbitrarily designated the term “varnish” to the curable composition which is applied pattern-wise in the invention, and the term “lacquer” to the composition which is applied overall. The lacquer may not necessarily contain a substantial quantity of a cellulose derivative.

The varnish and lacquer may in principle be thermally curable compositions or electron beam curable compositions, but far most preferably, they are both photopolymerizable compositions which are cured after application by means of UV light.

The essential ingredients of a typical UV-curable photopolymerizable composition to be applied on top of the receiving layer are a monomer and a photoinitiator.

A wide variety of photopolymerizable and photocrosslinkable compounds can be used in the present invention. Suitable monomers include the monomers disclosed in DE-OS Nos. 4005231, 3516256, 3516257, 3632657 and U.S. Pat. No. 4,629,676, unsaturated esters of polyols, particularly such esters of the α-methylene carboxylic acids, e.g. ethylene diacrylate, glycerol tri(meth)acrylate, diethylene glycol di(meth)acrylate, 1,3-propanediol di(meth)acrylate, 1,2,4-butanetriol tri(meth)acrylate, 1,4-cyclohexanediol di(meth)acrylate, 1,4-benzenediol di(meth)acrylate, pentaerythritol tetra(meth)acrylate, pentaerythritol triacrylate, dipentaerythritol pentacrylate, trimethylolpropane triacrylate, 1,5-pentadiol di(meth)acrylate, the bis-acrylates and bis-methacrylates of polyethylene glycols of molecular weight 200–500; unsaturated amides, particularly those of the α-methylene carboxylic acids, and especially those of α,ω-diamines and oxygen-interrupted ω-diamines, such as bis-acrylamide, methylene bis-methacrylamide, 1,6-hexamethylene bis-acrylamide, diethylene triamine trismethacrylamide, bis(γ-methacrylamidopropoxy)ethane, β-methacrylamidoethyl methacrylate, N-(β-hydroxyethyl)-β-(methacrylamido)ethyl acrylate, and N,N-bis(β-methacryloyloxyethyl)acrylamide; vinyl esters, e.g. divinyl succinate, divinyl adipate, divinyl phthalate, divinyl butane-1,4-disulphonate; and unsaturated aldehydes, e.g. sorbaldehyde (hexadienal).

The photopolymerizable composition may also comprise polymers and/or oligomers comprising two or more different polymerizable functions, e.g. acrylated epoxies, polyester acrylates, urethane acrylates, etc.

It is also possible to use monofunctional (meth)acrylic acid esters as monomer provided they are not to volatile and do not spread an unwanted odour. Suitable compounds include n-octylacrylate, decylacrylate, decylmethacrylate, stearylacrylate, stearylmethacrylate, cyclohexylacrylate, cyclohexylmethacrylate, phenylethylacrylate, phenylethylmethacrylate.

The most preferred compounds comprise one or more (meth)acrylate functional groups.

Other classes of photopolymerizable compounds containing one or more (meth)acrylate groups are reactive multifunctional monomers as disclosed in EP 502562.

Suitable photoinitiators are a wide variety of compounds or compound combinations which are known for this purpose. Examples are benzoin ethers, benzil ketals, polycyclic quinones, benzophenone derivatives, triarylimidazolyl dimers, photosensitive trihalomethyl compounds, for example trichloromethyl-s-triazines. Preference is given to 2,3-bisarylquinoxalines, as described in U.S. Pat. No. 3,765,898, and 2-aryl-4,6-bistrichloromethyl-s-triazines. The amount of photoinitiator or photoinitiator combination is generally between 1 and 25% by weight, preferably between 5 and 15% by weight. The UV curable composition may also contain a minor amount of a heat polymerization inhibitor which prevents premature polymerization before the UV curing step. Examples of such inhibitors include p-methoxyphenol, hydroquinone, aryl- or alkyl substituted hydroquinone, t-butylcatechol, pyrogallol, copper(I) chloride, phenothiazine, chloranil, naphtylamine, α-naphtol, 2,6-di-t-butyl-p-cresol, etc. A preferred polymerization inhibitor is 2-methyl hydroquinone. The heat polymerization inhibitors are preferable used in an amount of 0.001 to 5 parts by weight per 100 parts of monomer. Optionally the composition may also contain a minor amount of organic solvent, e.g. ethyl acetate.

The following commercially available compounds (chemical and commercial names) can be used with good result in a curable composition in connection with the present invention (without being exhaustive).

Photopolymerizable Monomers/Oligomers (chemical name; type, vendor)
pentaerythritol triacrylate; SR-444 (Sartomer)
trimethylolpropane triacrylate; SR-351 (Sartomer)
dipropyleneglycol diacrylate; SR-508 (Sartomer)
amine modified polyether acrylate oligomer; CN-501 (Sartomer)
isobornyl acrylate; SR-506 (Sartomer)
diethyleneglycol divinylether; RAPI-CURE DVE-2 (ISP)
triethyleneglycol divinylether; RAPI-CURE DVE-3 (ISP)
urethane acrylate blended with 2(2-ethoxyethoxy)ethylacrylate (SR256) CN-966H90 (Sartomer)
polybutadiene dimethyl acrylate; CN-301 (Sartomer)
low viscosity oligomer; CN-135 (Sartomer)
low viscosity oligomer; CN-137 (Sartomer)

Photoinitiators:

IRGACURE 907 (from Ciba-Geigy Co.)
NOVOPOL PI3000 (from Rahn Co.)
GENOCURE DEAP (from Rahn Co.)
IRGACURE 184 (from Ciba-Geigy Co.)
EZACURE KK (from Fratelli Lamberti Co.)
IRGACURE 500 (from Ciba-Geigy Co.)
IRGACURE 819 (from Ciba-Geigy Co.)

Thermal Initiators

AIBN—dicumyl peroxide—benzoyl peroxide-t-butyl peroxide—VAZO compounds (from DuPont Co.), e.g. VAZO 52—LUPEROX (from Atofina Co.), e.g. 233, 10, 11, 231, 101,—hydroperoxides, and peresters.

The varnish and lacquer compositions may also contain a colorant, which may be a soluble dye or a pigment.

Method for Producing Information Carriers

Having described the principal ingredients we will now discuss in more details the different steps of the process of the present invention.

According to a first embodiment the method for producing an information carrier comprises following steps, in order, (1) providing a two-layer assemblage comprising (i) a rigid sheet or web support optionally preprinted with security print, and (ii) a porous opaque receiving layer comprising a pigment and a binder, (2) printing digitally stored information onto said porous receiving layer, (3) applying on top of said layer in a predetermined pattern a curable varnish, by means of printing, spraying or jetting, (4) curing said applied varnish, whereby the parts of the receiving layer under said predetermined pattern remain non-transparent, (5) overall covering the thus obtained assemblage by coating, printing, spraying or jetting, with a curable lacquer whereby said lacquer penetrates all areas of the receiving layer not covered by the pattern of the varnish and renders them substantially transparent, and whereby the non-transparent pattern obtained by application of the varnish forms a substantially transparent watermark, (6) subjecting the thus obtained assemblage to a second curing step.

The rigid sheet or web support, as explained above, may be optionally preprinted with a so-called security print. The spectral characteristics of the inks of the security print are preferably chosen so that they are difficult to copy by means of a commercial colour copier. This security print can be applied by any known printing technique, e.g. letterpress, lithographic printing, gravure printing, silk screen printing, etc. A preferred technique is driographic printing being a waterless variant of lithographic printing whereby no fountain solution is applied to the printing press.

When the information carrier is meant to be cut later on in multiple identity cards the security print is repeatedly applied over multiple areas of the web or sheet by a step and repeat process thus giving rise to multiple identical items. These multiple identical items are distributed over the support according to a fixed pattern, e.g. a rectangular grid.

Then on top of the optionally preprinted sheet or web support a layer is coated the composition of which is extensively explained above. This receiving layer may be coated onto the support by any conventional coating technique, such as dip coating, knife coating, extrusion coating, spin coating, slide hopper coating and curtain coating.

It is particularly preferred, according to the present invention, that this layer be printed with a digitally stored set of information, for example, by means of ink jet printing. Other printing techniques using toner particles can however also be used.

In a most preferred embodiment this digitally stored information is personalized information different for each individual item present on the information carrier. For instance, this personalized information may be a unique individual card number assigned to the future bearer of the card, or the expiry date of the validity of the card, or personal data of the future bearer, e.g. a birth day, and/or a photo. Again, when the information carrier is meant to be cut in multiple ID cards, the ink jet printing step is repeated over multiple areas of the support in register with the security print pattern when present, thereby providing each item with different personalized information.

If ink jet printing is used, it may be performed by any known technique known in the art. In a first type of process a continuous droplet stream is created by applying a pressure wave pattern. This process is known as continuous ink jet printing. In a first embodiment the droplet stream is divided into droplets that are electrostatically charged, deflected and recollected, and into droplets that remain uncharged, continue their way undeflected, and form the image. Alternatively, the charged deflected stream forms the image and the uncharged undeflected jet is recollected. In this variant of continuous ink jet printing several jets are deflected to a different degree and thus record the image (multideflection system).

According to a second ink-jet process the ink droplets can be created "on demand" ("DOD" or "drop on demand" method) whereby the printing device ejects the droplets only when they are used in imaging on a receiver thereby avoiding the complexity of drop charging, deflection hardware, and ink recollection. In drop-on-demand the ink droplet can be formed by means of a pressure wave created by a mechanical motion of a piezoelectric transducer (so-called "piezo method"), or by means of discrete thermal pushes (so-called "bubble jet" method, or "thermal jet" method).

Ink compositions for ink jet typically include following ingredients: dyes or pigments, water and/or organic solvents, humectants such as glycols, detergents, thickeners, polymeric binders, preservatives, etc. It will be readily understood that the optimal composition of such an ink is dependent on the ink jetting method used and on the nature of the substrate to be printed. The ink compositions can be roughly divided in:

water based; the drying mechanism involves absorption, penetration and evaporation;

oil based; the drying involves absorption and penetration;

solvent based the drying mechanism involves primarely evaporation;

hot melt or phase change: the ink vehicle is liquid at the ejection temperature but solid at room temperature; drying is replaced by solidification;

UV-curable; drying is replaced by polymerization.

The colorants present in the ink jet ink may be dyes which are molecularly dissolved in the ink fluid, e.g. acid dyes which are bound by a cationic mordant in the ink receiver, or they may be pigments which are finely dispersed in the ink fluid.

According to steps (3) and (4) of the first embodiment a curable varnish composition, preferable UV-curable as explained above, is applied on top of the receiving layer provided with an image in a predetermined pattern, and is cured, preferable by UV is light, so that the layer underneath said predetermined pattern remains non-transparent. One way to obtain a non-transparency underneath the pattern is by curing the varnish composition before it can substantially penetrate into the receiving layer. Another way is to select a varnish, capable of penetrating into the receiving layer, but with a refractive index that differs sufficiently from the refractive index of the pigment, so that it is not capable of rendering the receiving layer transparent.

Again, when the information carrier is meant to be cut in multiple ID cards, the application and curing of the varnish is repeated over multiple areas of the information carrier in register with the multiple different items already present consisting of optional security print and personalized information.

According to step (5) the thus obtained assemblage is overall covered by coating, printing, spraying or jetting of a curable lacquer composition, preferably UV-curable as explained above. According to the first embodiment this lacquer is allowed to penetrate all areas of the receiving layer not covered by the predetermined pattern of the varnish. These areas on penetration by the lacquer gradually change to transparent. As explained earlier the better the match of the refraction indices of the lacquer composition and the pigment in the receiver the better the transparency. As a result the predetermined pattern of the varnish forms a non-transparent watermark on a transparent background. This watermark can have any form, e.g. a concrete design or alpha-numerical character, or a geometrical figure, or an abstract design. Finally in step (6) the thus obtained assemblage is subjected to a second curing step, preferable UV-curing.

In a preferred embodiment the method comprises an additional step (5bis), performed between steps (5) and (6), of laminating a protective foil on top of the assemblage before the final curing step.

Apparatuses for UV-curing are well-known to those skilled in the art and are commercially available. For example, the curing proceeds with medium pressure mercury vapour lamps with or without electrodes, or pulsed xenon lamps. These ultraviolet sources usually are equipped with a cooling installation, an installation to remove the produced ozone and optionally a nitrogen inflow to exclude air from the surface of the product to be cured during radiation processing. An intensity of 40 to 240 W/cm in the 200–400 nm region is usually employed. An example of a commercially available ultraviolet medium-pressure electrodeless mercury vapour lamp is the model VPS/I600 curing system of Fusion UV systems Ltd., UK. A pulsed xenon flash lamp is commercially available from IST Strahlentechnik GmbH, Nürtingen, Germany. Using the Fusion model one has also the possibility to use metal halide doped Hg vapour or XeCl excimer lamps, each with its specific UV emission spectrum. This permits a higher degree of freedom in formulating the curing composition: a more efficient curing is possible using the lamp with the most appropriate spectral characteristics.

As a result of the curing the cohesive force of the receiving layer and the adhesive force between the receiver and the support are strongly improved thereby rendering the information carrier tamper proof since, it has become strongly resistent to mechanical and chemical influences.

The substantial non-penetration of the receiving layer by the varnish and the thorough penetration by the lacquer can be realized by controlling the penetration time and/or the viscosity of the composition. In the first case the time between the application of the varnish and its curing is chosen to be so short that the varnish is unable to penetrate substantially, while the lacquer is given ample time to penetrate. Such a difference in penetration rates between the varnish and the lacquer could, for example, be realized by using a varnish with a significantly higher viscosity than that of the lacquer used. Also the affinity of the particle ink type used may play a role in the penetration speed. For instance, a hydrophobic oil-based ink will penetrate more slowly into a fairly hydrophilic receiving layer, such as a silica containing layer, than would an aqueous hydrophilic ink.

In the second embodiment of the present invention a negative image is obtained with respect to the first embodiment. According to this second embodiment a method is provided for producing a carrier of information, said method comprising the following steps, in order, (1') providing a two-layer assemblage comprising (i) a rigid sheet or web support optionally preprinted with security print, and (ii) a porous opaque receiving layer comprising a pigment and a binder, (2') printing digitally stored information onto said porous receiving layer, (3') applying on top of said receiving layer in a predetermined pattern a curable varnish by means of printing, spraying or jetting, whereby said varnish penetrates said receiving layer, thereby creating a transparent pattern, (4') after penetration, subjecting the thus obtained assemblage to a curing step, (5') overall covering the thus obtained assemblage by coating, printing, spraying or jetting, with a curable lacquer, (6') subjecting the thus obtained assemblage to a second curing step, whereby the pattern penetrated by the varnish remains transparent and forms a substantially transparent watermark, and the other parts of the image carrier remain opaque.

As can be seen, in this embodiment a transparent watermark is obtained on an opaque background which is the reverse of what is obtained with the first embodiment i.e. an opaque watermark on a transparent background.

The opaque background can be realised by selecting a lacquer capable of penetrating into the receiving layer, but with a refractive index that differs too much from the refractive index of the pigment, so that it is not capable of rendering the receiving layer transparent.

Another way to keep the background opaque, is by curing the lacquer composition before it can substantially penetrate into the receiving layer. The respective penetration behaviour of varnish and lacquer are reversed compared to the first embodiment. This behaviour is again controlled by the viscosity and the hydrophilicity of the varnish and lacquer.

Similar remarks as for the first embodiment can be made on the repetition over multiple items according to a fixed pattern of the optional security print, the personalized information and the watermark pattern, all in register with each other. In this preferred embodiment the method preferably comprises the additional step (7) or (7') of cutting the finished assemblage by known cutting means into a set of multiple ID cards, each carrying optional security print, watermark, and personalized information. Most types of ID cards have now the standardized dimensions of 85.6 mm×54.0 mm×0.76 mm. This final thickness can be reached by thermal lamination of one or more polymeric foils, e.g. PVC foils. The finished ID card can serve as an identity card, a security card, a driver's licence card, a social security card, a bank card, a membership card, a time registration card, a pay card and a credit card, etc.

Apart from the features described above the finished ID card may comprise additional security elements or information carriers such as a hologram, a magnetic strip, or a chip ("smart cards").

In further embodiments the receiving layer may be transparent and rendered substantially opaque i.e. having a transmission of less than 10% by penetration of the varnish or by penetration of the lacquer ensuring that the lacquer or varnish respectively have no effect on the transparency of the receiving layer. The same considerations as regards the refractive index of the ingredients apply in these embodiments.

The present invention will now be illustrated by the following examples without however being limited thereto.

EXAMPLES

Example 1

A dispersion A was prepared by mixing following ingredients 18.7 g of silica SIPERNAT 570 (Degussa Co.)

2.7 g of silanol modified polyvinyl alcohol POVAL R-3109 (Kuraray Co.)

1.7 g Of CAT-FLOC T2 (Calgon Europe N.V.)

0.03% of a biocide 0.03% of citric acid.

55.14 g of water

This dispersion was used to prepare following ink receiver composition:

9.4 g of water 9.9 g of a copoly(ethylene-vinylacetate) latex, VINNAPAS EP1 (Air Products & Chem.), 50% dispersion in water 0.4 g of poly(diallyldimethylammonium chloride) CAT FLOC-T2 (Calgon Europe N.V.)

78.3 g of dispersion A 2 g of surfactant cetyltrimethylammonium bromide.

The thus prepared ink receiver composition was coated on a white opaque polyvinyl chloride support, having a thickness of 165 μm, which was printed before by means of driographic printing with gradually changing colour patterns, serving as security print. The wet coating thickness of this ink receiving layer was 60 μm. After drying the ink receiving layer was printed by means of EPSON STYLUS COLOR 900 ink jet printer with a set of digitally stored personal information, like photo, name, address, birthday, birth place, identification number, etc.

The obtained image containing assemblage was then locally, in a predetermined pattern, e.g. in the form of a design, overprinted two times in register with Akzo Nobel UV screen varnish UV000100-03 (viscosity 650 mPa·s at 20° C.) by means of screen printing technique. A NBC monofilament polyester screen of 120 mesh/cm was used. Immediately after locally printing of the pattern, before the varnish could penetrate substantially the ink receiving layer, the assemblage was subjected to a UV exposure thereby curing the area of the pattern. The curing was performed by means of a DRSE-120 conveyor provided with a VPS/1600 UV lamp (240 W/cm—speed 20 cm/s).

In the next step the assemblage was covered integrally by means of a coating knife with a UV-curable lacquer having following composition:

34.4% of amino modified polyether acrylate oligomer CRAYNOR 501 (=CN501) (from Sartomer Co.)

51.6% dipropyleneglycol diacrylate (DPGDA) (SR-508 from Sartomer)

2% of ethyl acetate

2% of a 10% solution of methyl hydroquinone in CN501/SR-508 40/60

10% of photoinitiator IRGACURE 907 (Ciba-Geigy Co.).

Only on those places were previously no UV screen varnish was printed the overall coated UV-curable lacquer was able to penetrate into the opaque ink receiving layer and made it transparent in about one minute after application. Then a transparent protective polyethylene terephthalate (PET) foil was laminated on top of the assemblage. An overall UV curing was performed by means of a DRSE-120 conveyor provided with a VPS/1600 UV lamp (240 W/cm—speed 20 cm/s).

The underlying driographic security print was only clearly revealed in those where no pattern-wise UV screen printed varnish was present. The non-transparent design formed by the cured varnish represented a watermark.

Example 2

A white opaque polyvinyl chloride support, having a thickness of 165 μm, which was printed before by means of driographic printing with gradually changing colour patterns serving as security print, was coated with the ink receiver composition as described in ex. 1. The wet coating thickness of this ink receiving layer was 60 μm. After drying the ink receiving layer was printed by means of an EPSON STYLUS COLOR 900 ink jet printer with a set of digitally stored personal information (photo, name and address, birthday and place, identification number, etc.).

The obtained image containing assemblage was then pattern-wise overprinted 5 times in register—in order to obtain a sufficiently thick varnish layer—with a UV-curable inkjetable varnish. Composition of the UV-curable inkjetable varnish:

34.4% of amine modified polyether acrylate oligomer CRAYNOR 501 (=CN501) (from Sartomer Co.)

51.6% of dipropyleneglycol diacrylate (DPGDA) (SR-508 from Sartomer)

2.00% of ethyl acetate 2.00% of a 10% solution of methylhydroquinone in CN501/SR-508 40/60

10% of photoinitiator IRGACURE 907 (Ciba-Geigy Co.).

The viscosity of the varnish composition was 17 mPa·s at 20° C. A Spectra 256 UV piezoelectric print head (92 dpi—head voltage 155V—jet frequency 2 kHz) was used for the consecutive printing of the UV-curable varnish image on the ink receiver composition. The jetted UV-varnish was able to penetrate in the opaque ink receiving layer and made it transparent pattern-wise.

2 minutes after the UV-curable varnish was pattern-wise jetted on the inkjet receiver, the assemblage was subjected to UV-light by means of a DRSE-120 conveyer provided with VPS/1600 UV lamp (240 W/cm—speed 20 cm/sec.).

In the next step the assemblage was covered integrally by means of a coating knife with an Akzo Nobel Inks UVF00106-405 UV-curable flexo lacquer (viscosity 220 mPa·s at 20° C.) at a coating thickness of 60 μm, instantly followed by laminating a transparent protective PET-foil (thickness 100 μm) on top of the UV-curable lacquer layer. Immediately after lamination the obtained layer assemblage was cured in the same manner as described above. The obtain a complete curing two passes were necessary. The lapse of time between the coating step and the UV-curing step was 15 seconds maximally.

Only on those places were previously UV-curable varnish was jetted, the ink receiving layer was made transparent.

The underlying driographic security print was only clearly revealed in those areas were pattern-wise ink jetted UV-curable varnish was present, whereby a watermark was created.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An information carrier comprising: a rigid sheet or web support; an opaque porous receiving layer capable of being rendered substantially transparent by penetration by a lacquer, said receiving layer containing a pigment and a binder; an image provided onto and/or in said receiving layer; a cured pattern of a varnish provided onto said receiving layer provided with said image or onto and/or in said receiving layer provided with said image if said varnish is incapable of rendering said receiving layer transparent; and a cured layer of said lacquer provided on said receiving layer provided with said image and said cured pattern of said varnish, said lacquer having rendered said parts of said receiving layer in contact therewith substantially transparent, wherein said cured pattern of said varnish forms an opaque watermark.

2. Information carrier according to claim 1, wherein the refractive index of the pigment and the refractive index of the lacquer in the receiving layer differ by no more than 0.04 and wherein the refractive index of the binder and the refractive index of the lacquer differ by no more than 0.04 when the ratio by weight of the binder to total pigment becomes larger than 0.17.

3. Information carrier according to claim 1, wherein said rigid sheet or web support has been preprinted with a security print.

4. Information carrier according to claim 1, wherein said image is applied by an ink-jet process.

5. Information carrier according to claim 1, wherein said cured layer of said lacquer has been UV-cured.

6. Information carrier according to claim 1, wherein said cured pattern of said varnish has been UV-cured.

7. Information carrier according to claim 1, wherein said pattern of said varnish is applied by printing, spraying or jetting.

8. Information carrier according to claim 1, wherein said image is personalized information.

9. Information carrier according to claim 8, wherein said information carrier with personalized information is an identification card.

10. Information carrier according to claim 9, wherein said identification card is selected from the group consisting of an identity card, a security card, a driver's licence card, a social security card, a membership card, a time registration card, a bank card, a pay card and a credit card.

11. Information carrier according to claim 1, wherein said support is a rigid sheet is made of polyvinyl chloride, polycarbonate or poly(ethylene terephthalate).

12. Information carrier according to claim 1, wherein said pigment is an inorganic pigment.

13. Information carrier according to claim 12, wherein said inorganic pigment is silica.

14. Information carrier according to claim 12, wherein said inorganic pigment has a refractive index from 1.45 to 1.55.

15. An information carrier comprising: a rigid sheet or web support; an opaque porous receiving layer capable of being rendered substantially transparent by penetration by a varnish, said receiving layer containing a pigment and a binder; an image provided onto and/or in said receiving layer; a cured pattern of said varnish provided in said receiving layer provided with said image; and a cured layer of a lacquer provided onto said receiving layer provided with said image and said cured pattern of said varnish, or onto and/or in said receiving layer provided with said image and said cured pattern of said varnish if said lacquer is incapable of rendering said receiving layer transparent, said varnish having rendered said parts of said receiving layer in contact therewith substantially transparent, wherein said cured pattern of said lacquer forms a substantially transparent watermark.

16. Information carrier according to claim 15, wherein the refractive index of the pigment and the refractive index of the lacquer in the receiving layer differ by more than 0.04.

17. Information carrier according to claim 15, wherein said rigid sheet or web support has been preprinted with a security print.

18. Information carrier according to claim 15, wherein said image is applied by an ink-jet process.

19. Information carrier according to claim 15, wherein said cured layer of said lacquer has been UV-cured.

20. Information carrier according to claim 15, wherein said cured pattern of said varnish has been UV-cured.

21. Information carrier according to claim 15, wherein said pattern of said varnish is applied by printing, spraying or jetting.

22. Information carrier according to claim 15, wherein said image is personalized information.

23. Information carrier according to claim 22, wherein said information carrier with personalized information is an identification card.

24. Information carrier according to claim 23, wherein said identification card is selected from the group consisting of an identity card, a security card, a driver's licence card, a social security card, a membership card, a time registration card, a bank card, a pay card and a credit card.

25. Information carrier according to claim 15, wherein said support is a rigid sheet is made of polyvinyl chloride, polycarbonate or poly(ethylene terephthalate).

26. Information carrier according to claim 15, wherein said pigment is an inorganic pigment.

27. Information carrier according to claim 26, wherein said inorganic pigment is silica.

28. Information carrier according to claim 26, wherein said inorganic pigment has a refractive index from 1.45 to 1.55.

29. An information carrier comprising: a rigid sheet or web support; a transparent porous receiving layer capable of being rendered substantially opaque by penetration by a lacquer, said receiving layer containing a pigment and a binder; an image provided onto and/or in said receiving layer; a cured pattern of a varnish provided onto said receiving layer provided with said image, or onto and/or in said receiving layer provided with said image if said varnish is incapable of rendering said receiving layer opaque; and a cured layer of said lacquer provided on said receiving layer provided with said image and said cured pattern of said varnish, said lacquer having rendered said parts of said receiving layer in contact therewith substantially opaque, wherein said cured pattern of said varnish forms a transparent watermark.

30. Information carrier according to claim 29, wherein the refractive index of the pigment and the refractive index of the lacquer in the receiving layer differ by more than 0.04 and wherein the refractive index of the binder and the refractive index of the pigment differ by no more than 0.04.

31. Information carrier according to claim 29, wherein said rigid sheet or web support has been preprinted with a security print.

32. Information carrier according to claim 29, wherein said image is applied by an ink-jet process.

33. Information carrier according to claim 29, wherein said cured layer of said lacquer has been UV-cured.

34. Information carrier according to claim 29, wherein said cured pattern of said varnish has been UV-cured.

35. Information carrier according to claim 29, wherein said pattern of said varnish is applied by printing, spraying or jetting.

36. Information carrier according to claim 29, wherein said image is personalized information.

37. Information carrier according to claim 36, wherein said information carrier with personalized information is an identification card.

38. Information carrier according to claim 37, wherein said identification card is selected from the group consisting of an identity card, a security card, a driver's licence card, a social security card, a membership card, a time registration card, a bank card, a pay card and a credit card.

39. Information carrier according to claim 29, wherein said support is a rigid sheet is made of polyvinyl chloride, polycarbonate or poly(ethylene terephthalate).

40. Information carrier according to claim 29, wherein said pigment is an inorganic pigment.

41. Information carrier according to claim 40, wherein said inorganic pigment is silica.

42. Information carrier according to claim 40, wherein said inorganic pigment has a refractive index from 1.45 to 1.55.

43. An information carrier comprising: a rigid sheet or web support; a transparent porous receiving layer capable of being rendered substantially opaque by penetration by a varnish, said receiving layer containing a pigment and a binder; an image provided onto and/or in said receiving layer; a cured pattern of said varnish provided in said receiving layer provided with said image; and a cured layer of a lacquer provided onto said receiving layer provided with said image and said cured pattern of said varnish, or onto and/or in said receiving layer provided with said image and said cured pattern of said varnish if said lacquer is incapable of rendering said receiving layer opaque, said varnish having rendered said parts of said receiving layer in contact therewith substantially opaque, wherein said cured pattern of said lacquer forms a substantially opaque watermark.

44. Information carrier according to claim 43, wherein the refractive index of the pigment and the refractive index of the lacquer in the receiving layer differ by no more than 0.04 and wherein the refractive index of the binder and the refractive index of the pigment differ by no more than 0.04.

45. Information carrier according to claim 43, wherein said rigid sheet or web support has been preprinted with a security print.

46. Information carrier according to claim 43, wherein said image is applied by an ink-jet process.

47. Information carrier according to claim 43, wherein said cured layer of said lacquer has been UV-cured.

48. Information carrier according to claim 43, wherein said cured pattern of said varnish has been UV-cured.

49. Information carrier according to claim 43, wherein said pattern of said varnish is applied by printing, spraying or jetting.

50. Information carrier according to claim 43, wherein said image is personalized information.

51. Information carrier according to claim 50, wherein said information carrier with personalized information is an identification card.

52. Information carrier according to claim 51, wherein said identification card is selected from the group consisting of an identity card, a security card, a driver's licence card, a social security card, a membership card, a time registration card, a bank card, a pay card and a credit card.

53. Information carrier according to claim 43, wherein said support is a rigid sheet is made of polyvinyl chloride, polycarbonate or poly(ethylene terephthalate).

54. Information carrier according to claim 43, wherein said pigment is an inorganic pigment.

55. Information carrier according to claim 54, wherein said inorganic pigment is silica.

56. Information carrier according to claim 54, wherein said inorganic pigment has a refractive index from 1.45 to 1.55.

* * * * *